May 30, 1944.  C. MURRAY-WALLER  2,349,982
STALL WARNING DEVICE FOR AIRPLANES
Filed Oct. 18, 1939  3 Sheets-Sheet 1

Inventor:
CLIVE MURRAY-WALLER
By Michael S. Striker
his Agent.

Inventor
Clive Murray-Waller

Inventor.
Clive Murray-Waller

Patented May 30, 1944

2,349,982

UNITED STATES PATENT OFFICE 2,349,982

STALL WARNING DEVICE FOR AIRPLANES

Clive Murray-Waller, Ashfield, near Sydney, New South Wales, Australia

Application October 18, 1939, Serial No. 299,922
In Australia October 22, 1938

8 Claims. (Cl. 177—311)

This invention relates to safety appliances for airplanes and, more particularly, to instruments adapted to be fitted to the wings of airplanes and function to give a pilot visible and/or audible warning indication when the air-speed of the airplane approaches the stalling speed or minimum flying speed of the machine.

The use in this specification of the term "airplane" is intended to embrace and shall be deemed to include flying boats, seaplanes and similar aircraft.

A danger in modern aviation is due to unexpected or unforeseen stalling of an airplane. It has been stated by recognized authorities in the aeronautical world that a high percentage—one authority has stated 78 per cent—of accidents resulting in airplane crashes is due to the stalling of an airplane at such height above the ground that the pilot is unable to get the machine out of the stall before the ground is reached.

It is obvious that when an airplane is about to land, its air speed must be at or below the minimum flying speed—that is, the stalling speed—at the time when its wheels touch the ground. Otherwise it will balloon, that is to say it will rebound and continue in flight for a short period. If the air-speed be considerably above the stalling speed when the airplane wheels touch land, the machine will rebound excessively and, unless care is exercised, the airplane will stall when it is in the air.

Consequently, it is the aim of a pilot, when he is preparing to land, to reduce the air speed of his airplane so that the machine stalls when the wheels reach the ground, thereby avoiding ballooning. In making a landing, the pilot may reduce the air speed too much, thereby causing the airplane to stall before it reaches the ground and to crash with consequential damage to the machine and injury to the occupants.

Another cause of airplane stalling is due to a pilot stretching a glide to travel a longer distance than usual for the same reduction in altitude. That is to say, the airplane is glided at too acute an angle to the horizontal, and in consequence, flying speed is lost.

A further danger cause is a premature take-off by a pilot when attempting to lift the airplane before minimum flying speed has been attained. When this takes place, the machine may rise for a short distance but then its nose will dip and the airplane will fall.

A still further example of stalling is due to the stalling of one wing in banked turns and in skid turns when the airplane, regarded as a unit, may be travelling above the stalling speed, but one of its wings is slightly below that speed. When a pilot flying an airplane takes the machine into a steeply banked turn an inversion of controls is effected, that is to say, the rudder control and elevator controls are interchanged to a certain extent—the rudder being utilised as the elevators, and the elevators as the rudder. As the machine banks more and more, it is the duty of the pilot to gradually interchange his controls. In particular, it is necessary to change his rudder control from "left-rudder" to "right-rudder" (or "top-rudder"), or from "right-rudder" to "left-rudder" (or "top-rudder") for left or right turns, respectively. If he does not give sufficient "top rudder," the machine will lose elevation and partially pivot about its inner wing which is, therefore, travelling at less speed than the remainder of the machine. Similarly, when a pilot does a skid turn, namely, turning the machine without banking, the inner wing is likely to stall, even though the air speed of the machine is above the stalling speed.

Should a pilot's judgment and skill be temporarily diminished by illness, fatigue or by any other cause, there is a possibility of a miscalculation of the speed of a airplane which might cause the machine to stall and possibly crash. Should the airplane stall when it is at considerable height above the ground, the pilot has sufficient time and space to take the machine out of the spin resultant upon the stall by straightening out, diving and accelerating the engines, but when the airplane is near the ground at the time that a stall occurs a crash is almost inevitable.

This invention has been devised with the object of providing an instrument which, when fitted to an airplane, will give a clear indication to the pilot when taking-off that the machine has sufficient air speed for flight: will indicate to the pilot during flight that the air speed is approaching the stalling speed and additionally will indicate whether either wing is near the stalling speed when the airplane is making a turn: will indicate to the pilot when desirous of effecting a landing of the machine that the speed is not excessive for the purpose: and furthermore, will warn the pilot on those occasions when he is stretching a glide or preparing to land, should the air speed become reduced perilously close to the stalling speed.

The operation of a stall warning instrument, constructed according to my invention, is based upon the known principles that the flexure of a diaphragm is directly proportional to the change of pressure of air, and that the suctional force through the suction pipe of a Venturi tube is directly proportional to the square of the velocity of air through said Venturi tube. Accordingly, the instrument comprises a casing having a diaphragm therein, a Venturi tube connected to the casing so that its suction pipe is in communication with the diaphragm chamber, an electrical contact point on the diaphragm adapted to make contact with an adjustable contact point secured within the casing, said contact points being connected to a source of electrical energy and to an indicating and/or warning device whereby an electric current will flow only when said contact points are in abutment. The adjustable contact point is set so that contact of the points will take place at a predetermined speed which is greater than the known stalling speed of the airplane as shown by the air speed indicator.

Reference is made to the accompanying drawings illustrating a practical embodiment of the invention.

Figure 1:
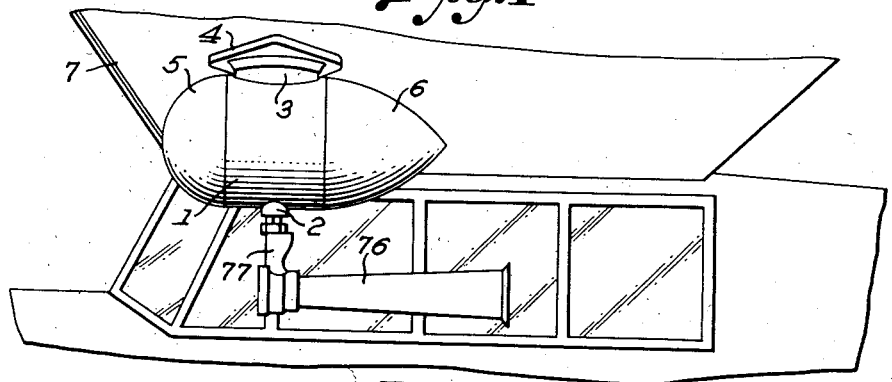
Fig. 1 is a perspective view of the instrument fitted to a wing of an airplane.

In these views 1 indicates a cylindrical casing having on its lower surface a boss 2 and on its upper surface a bracket 3 adapting it for adjustable fixture to a mounting 4. Fitted to the casing are a nose-piece 5 and a tail-piece 6. The casing and mounting are preferably constructed of cast metal, while the nose-piece and the tail-piece are formed of a spun metal and so shaped that the structure forms a body of substantially streamlined design. The mounting 4 may be secured to the wing 7 of an airplane, indicated by 8, by any suitable means.

The internal parts of the casing 1 comprise a vertical diametral strut or column 9 axially aligned with the boss 2 and having a central boss 10 wherein an axial hole 11 is formed. An electrical insulating bush 12 of suitable dielectric material having an orifice 13 in its lower portion is fitted tightly within the hole 11, and a metal plug 14 having a screw-threaded bore 15 and a downward communicating hole 16 is securely fitted within the bush 12.

Figure 6:
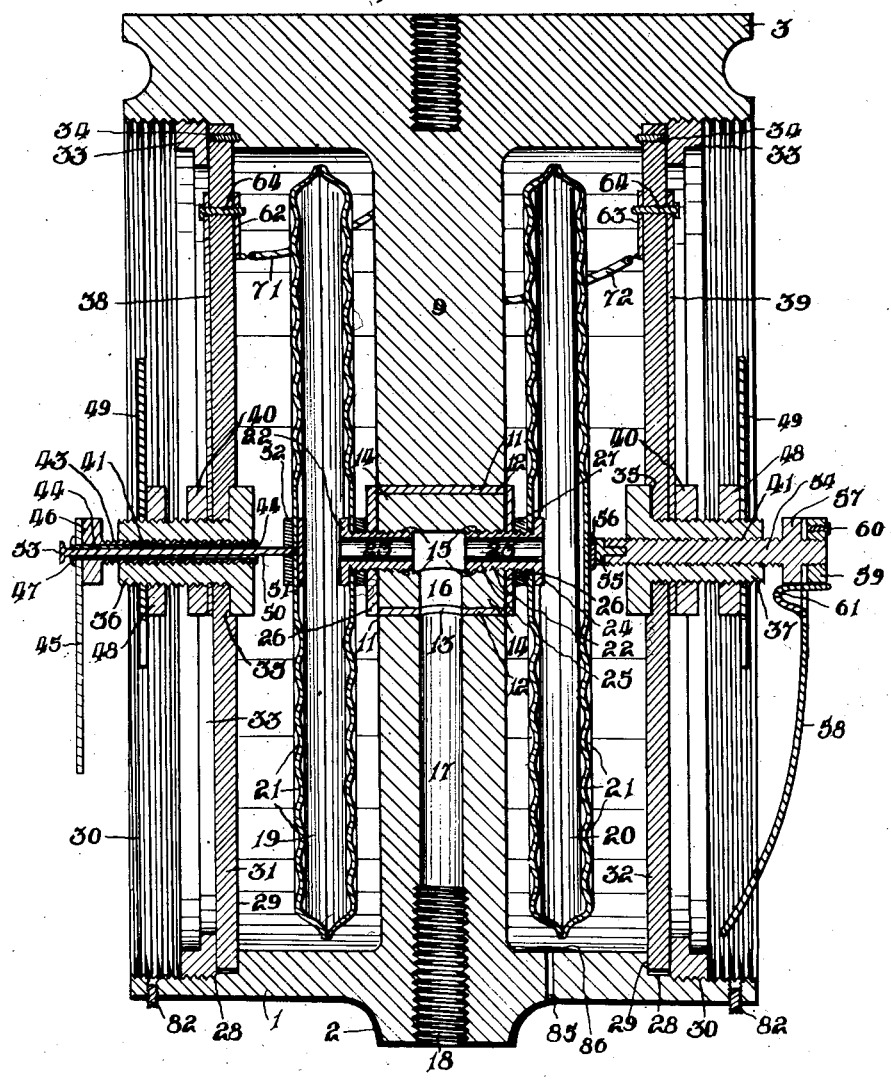
Fig. 6 is a longitudinal cross-sectional view of the instrument, drawn to twice the scale of the preceding views Figs. 2–5.

The hole 16 registers with the orifice 13 in the insulating bush 12, and it is co-axial with a vertical bore 17 in the casing boss 2 and strut 9 to join said hole 16. The lower portion of the bore 17 is internally threaded at 18—see Fig. 6.

Two diaphragms 19 and 20, constructed of thin gauge metal and formed with concentric corrugations 21, are supported in parallel relationship on opposite sides of the strut 9 by bolts 22. Each of the bolts 22 has an axial hole 23 and a flanged head 24. The shanks 25 of said bolts are passed through holes formed centrally in inner walls of the diaphragms 19 and 20, and the flanged heads of the bolts are fitted within said diaphragms. Gaskets 26 are fitted about the bolts 22 which are clamped rigidly to said diaphragms by locking collars 27—see Fig. 6.

The bolts 22 are screwed into the threaded bore of the metal plug 14 so that the bore 17 of the boss 2 and strut 9 is placed in communication with the interiors of the two diaphragms 19 and 20 via the orifice 13 in the insulating bush 12, bore 17 of the metal plug 14, and axial holes 23 of said bolts 22.

Rabbets 28 are formed circumferentially within the opposite ends of the cylindrical casing 1, and the shoulders 29, thus provided, are at some distance from the ends of said casing. The rabbets 28 are screw-threaded at 30, for the greater portion of their depth for the purpose to be hereinafter explained. Circular face plates 31 and 32, constructed of relatively rigid dielectric material such as vulcanite, are placed within the inner non-threaded portions of the rabbets 28 in abutment with the shoulders 29 close to the diaphragms 19 and 20, respectively. These face plates 31 and 32 are slightly smaller in diameter than their seating rabbets 28 in order that they will not be buckled should the metal casing 1 be contracted owing to excessive cold. Metal rings 33 have a screw-threaded engagement with the rabbets 28 and press tightly upon the face plates 31 and 32 to maintain them firmly in position, and grub screws 34 are provided to prevent the rotation of said face plates 31 and 32.

Figure 2:
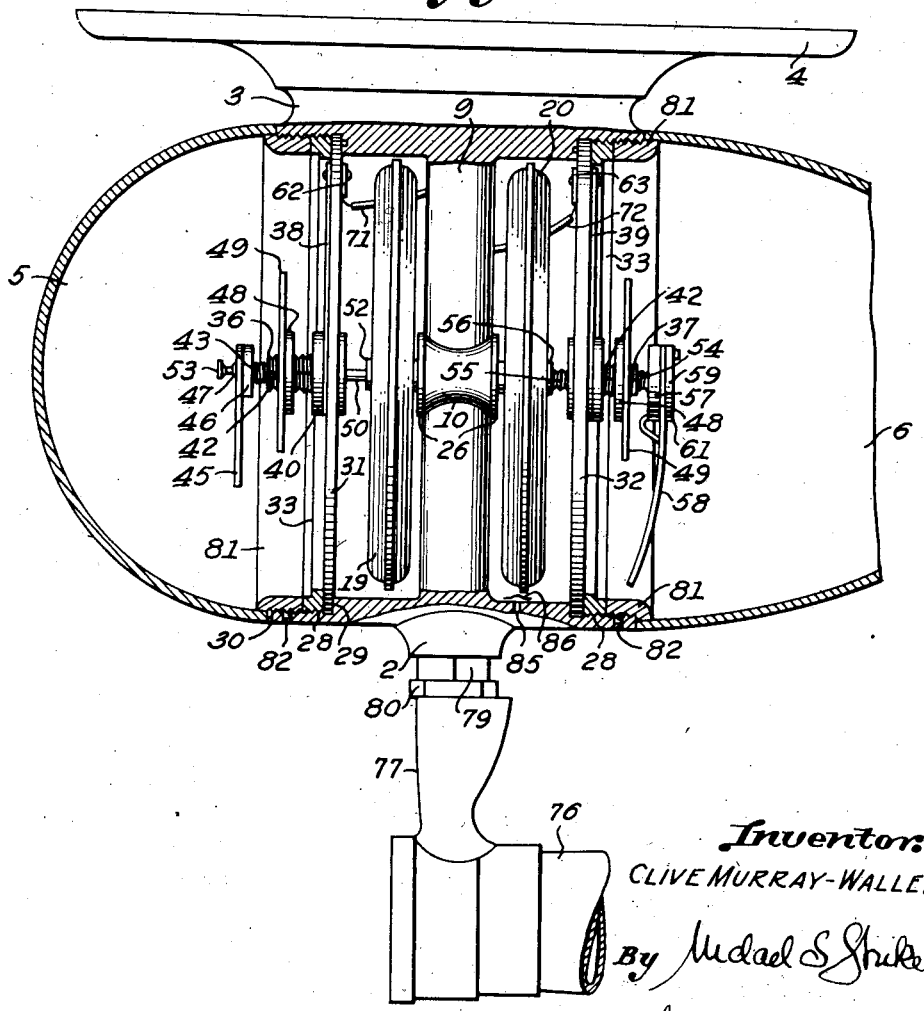
Fig. 2 is a view on enlarged scale in side elevation, partly in section, of the instrument.
Figure 3:
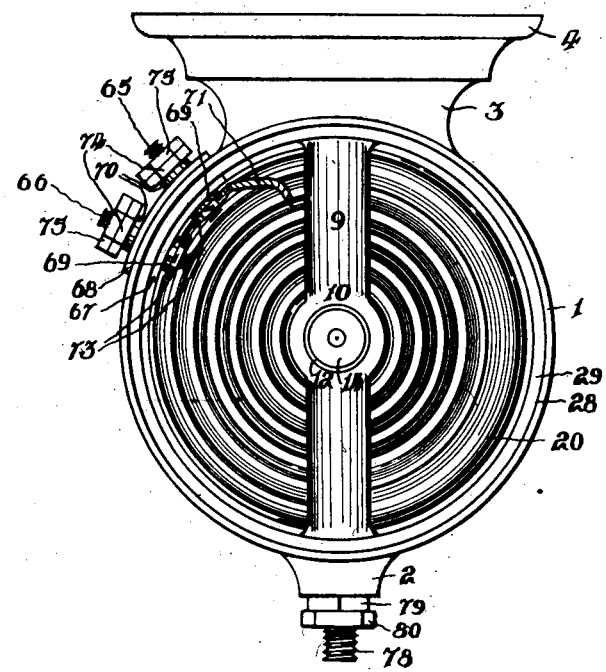
Fig. 3 is a front elevational view of the instrument seen in Fig. 2, but with the nose piece, the tail piece, one of the two diaphragms and the Venturi tube omitted for clarity of illustration.

A hole is formed centrally in each of the face plates 31 and 32, and a shallow recess 35 is provided on the inner surface of each of said face plates about its central hole. Bolts 36 and 37 are fitted axially through the face plates 31 and 32, respectively, with their shanks projecting outwardly so that the head of each bolt lies partially within the recess 35. Two strips 38 and 39 of thin metal, each having a large hole at one end and a small hole at its opposite end, are fitted to their respective bolts 36 and 37 and lie flat against the respective face plates 31 and 32. The metal strips and face plates are then secured in assembled relationship by round nuts 40. Each of the bolts 36 and 37 is drilled axially and is internally threaded at 41, while its shank is tapered slightly and is slotted longitudinally at 42—see Fig. 2.

A bolt 43, having its external diameter equal to the internal diameter of the threaded hole 41, is engaged within the bolt 36. This bolt 43 has a smooth axial aperture within which is fitted a dielectric bush 44. A pointer 45 is fastened to the head 46 of the bolt 43, and an electrical contact point 47 of non-corrosive metal is provided at the outer end of said bolt. The bolt 43 is locked within the bolt 36 by a clamping nut 48 having radial arms 49 to facilitate its manipulation. The nut 48 has a screw-threaded engagement with threads formed externally on the tapered shank of the bolt 36 so that by screwing it nearer the bolt head the shank of the bolt 36 tightens about the bolt 43.

A relatively thin metal rod 50, which has an enlarged head 51 at its inner end, projects outwardly from the diaphragm 19 through a small hole formed centrally therein, and said rod is secured in position by a clamping ring 52 brazed or otherwise fastened thereto. The rod 50 passes through the dielectric bush 44 within the bolt 43 and its outer end, which extends past the contact point 47, has an opposite contact member 53 screwed thereon. When the diaphragm 19 is in normal position, the distance between the contact points 47 and 53 is adjusted by loosening the clamping nut 48 and then rotating the bolt 43 until the desired contact distance is obtained, when the bolt 43 is again locked by rotating said nut 48.

The axial hole 41 of the bolt 37 adjacent the diaphragm 20 is threadedly engaged by a bolt 54. This bolt 54 has at its inner end a noncorrosive contact point 55 adapted to contact with a similar point 56 fitted centrally of the diaphragm 20, and said bolt has near its outer end a milled head 57. The shank of the bolt 54 extends outwardly beyond the head 57 and fitted rotatably thereon is a pointer 58. This pointer is held so as to be rotatable by a nut 59 brazed to the bolt 37, and it is locked in selected adjusted position by a set screw 60, fitted within the nut 59 and adapted to press against said pointer. The pointer 58 has a sprung tongue 61, which bears against the periphery of the milled head 57 of said bolt 54. A nut 48 having radial operating arms 49 engages the threads of the bolt 37 to clamp the inner bolt 54 in its adjusted position in the manner previously described.

The metal strips 38 and 39 are connected to metal contact plates 62 and 63, respectively, by small bolts 64 passed through holes at the ends of said strips and through corresponding holes in the respective dielectric face plates 31 and 32 to engage in tapped apertures in said contact plates 62 and 63.

Figure 7:
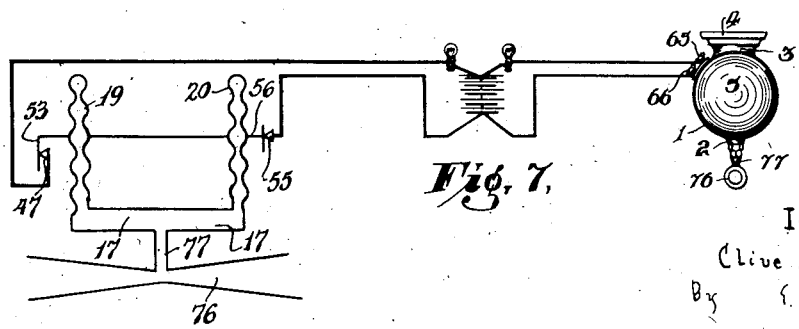
Fig. 7 is a diagrammatical view of an electrical illustration of a pair of instruments.

Terminal posts 65 and 66 pass through the metal casing 1 and they are insulated therefrom by strips of dielectric material 67—68 and by insulating sleeves (not shown) fitted about their mid-portions. The terminals 65 and 66 are firmly clamped in position by round nuts 69—70, on their inner and outer portions, respectively, and the terminal 65 is electrically connected to the contact plate 62 by a covered lead wire 71, the terminal 66 being connected to the contact plate 63 by a similar wire 72. It is preferred that the lead wires 71—72 should be brazed to the contact plates 62—63, and secured to the terminals 65—66 by clamping nuts 73. The outer ends of the terminals 65—66 have nuts 74 and locknuts 75 to facilitate the fixture thereto of a connecting wire from a battery or other source of electrical energy to the one terminal and the fixture of a connecting wire leading to a warning or indicating device to the other terminal. A suitable wiring circuit for the purposes of the invention is illustrated in Fig. 7.

A Venturi tube 76 having a suction pipe 77 is connected and sealed to the bore 17 of the boss 2 and vertical strut 9 by means of a stud 78 having an integral nut 79 and a lock-nut 80.

In order that the nose piece 5 and the tail piece 6 may be conveniently fitted to the casing 1, they are provided with metal rings 81 threaded at their outer ends and adapted for threaded engagement with the rabbets 28. The nose and tail pieces are securely locked in position by grub screws 82 passed through the casing 1 and impinging against the threads of the metal rings 81.

Figure 4:
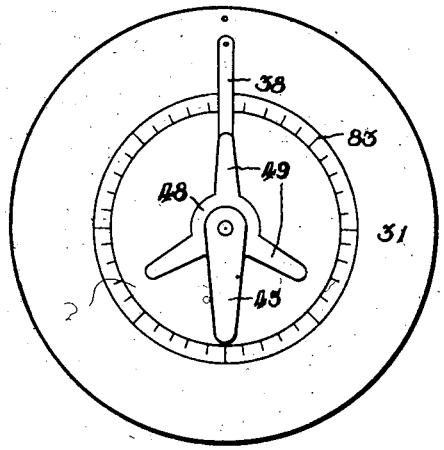
Fig. 4 shows in elevation the front face plate of the instrument.
Figure 5:
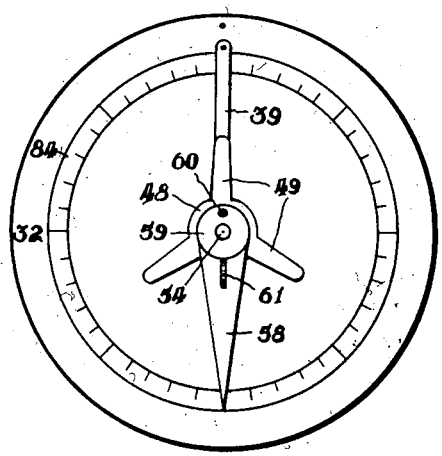
Fig. 5 is a similar view of the rear face plate of the instrument.

In order that adjustment of the contact points 47—53 and 55—56 may be effected accurately and quickly, the face plates 31 and 32 have scales 83 and 84, respectively, marked thereon—see Figs. 4 and 5.

A static hole 85 is formed in the wall of the casing 1 so that the barometric pressure of air within said casing will be kept substantially equal to the pressure of outside air. The inner end of the static hole is covered with a piece of finely woven cloth 86 to prevent too rapid egress of air from said casing and to prevent the entry of dust.

Two instruments as hereinbefore described are used, each being fitted to a wing or a wing strut on opposite sides of the airplane outside the zone of the propeller slip-stream, and they are electrically connected to an accumulator or battery system and to a suitable indicating or warning device.

This indicating or warning device may be an electric lamp and/or a buzzer or the equivalent which is installed within the cockpit of the airplane, preferably above the instrument board. For brevity of description, it will be hereinafter described as an electric lamp.

When an air stream passes through the Venturi tube 76, the air pressure at the point of constriction of said tube is diminished and air is drawn through the suction pipe 77. The suction pipe 77 is in communication with the internal chambers of the diaphragms 19 and 20 through the bore 17, the hole 16 of the plug 14, and the axial holes 23 of the bolts 22.

The chambers of said diaphragms are thus partially evacuated and their corrugated walls are flexed inwardly, the decrease of pressure in the diaphragms being directly proportional to the square of the velocity of the air passing through the Venturi tube. The bolts 43 and 54 are initially adjusted so that it will require a greater decrease of air pressure within the diaphragm 20 to break the contacts 55—56 than the decrease of air pressure within the diaphragm 19 to make the contacts 53—47.

When a slight suctional force is applied through the pipe 77 causing the diaphragm 19 to be flexed slightly, the rod 50 affixed centrally to the outer face of said diaphragm is drawn inwardly and electrical contact is made between the contact points 53—47. As the contact 55—56 is not then broken the electrical circuit from the terminal 65 to the terminal 63 is complete, current flowing through the lead wire 73, contact plate 62, metal strip 38, bolt 36, bolt 42, contacts 47—53, rod 50, diaphragm 19, bolt 22, plug 14, bolt 22, diaphragm 20, contacts 56—55, bolt 54, bolt 37, metal strip 38, contact plate 63 and lead wire 72.

Upon an increase of the suction through the pipe 77, the diaphragm 20 is flexed or concaved so that contact point 56 is withdrawn from contact 55 on the bolt 54 whereby the continuity of the electrical circuit is broken and the electrical current ceases to flow.

To adjust each instrument fitted to the airplane, the nose-piece 5 and tail-piece 6 are removed and the distance between contacts 53 and 47 is set so that the suction induced by a relatively low air speed of the airplane such as, for example, ten miles per hour causes the diaphragm 19 to concave sufficiently for the said contacts 53—47 to close, and the contact point 55 is adjusted to bear against contact 56 on the diaphragm 20 so that a suction due to an air speed greater than the known stalling speed of the airplane by, say, ten miles per hour is necessary to break the connection between the contacts 56 and 55.

The two sets of contacts are adjusted by partially unscrewing the locking nuts 48 on the bolts 36 and 37, respectively, and rotating the bolt 43 by means of the pointer 45 to set the required distance between the contacts 53 and 47 as indicated by the scale 83.

The calibration of the contacts 55—56, is effected by rotating the bolt 54 so that the diaphragm 20 is flexed to an extent that it will not be further concaved until there is exerted upon it a suctional force corresponding to the suction exerted at the stalling speed of the airplane. The set-screw 60 securing the pointer 58 is then loosened and said pointer is turned to the zero position of the scale 85, which position then indicates the exact stalling speed of the airplane. The pointer 58 is then moved until it registers with the scale marking of "10" for example, which shows that the instrument has been set for 10 miles per hour above the stalling speed. The lock-nuts 43 are now screwed tightly upon the bolts 36 and 37 to clamp the bolts 43 and 54, respectively, in their set positions when the nose-piece 5 and the tail-piece 6 are replaced and firmly secured in position by grub-screws 82.

When the airplane is at rest, the contact 47—53 is broken and as no electrical current is flowing the indicating device will not be then operating. But, when the airplane is about to take off and its air speed reaches about ten miles per hour, the electrical contact 53—57 is made and an electrical current flows from the accumulator through the electric light bulb and through the instrument back to the accumulator.

The electric lamps within the cockpit then glow and continue to do so until the airplane reaches an air speed ten miles per hour in excess of its stalling speed, whereupon the contacts 55—56 in each instrument are separated and by breaking the circuit the lamps cease to glow. The pilot is thus made aware that he has attained a speed at which it is safe to take off.

If either or both of the lamps is or are caused to glow during flight, the pilot is instantly informed that the air speed of the airplane is dangerously near the stalling speed, and he is thereby given a clear indication of that fact with ample warning to take such action as is necessary to prevent a stall.

During a glide or when landing, the pilot may set his gliding angle by keeping the airplane at such an angle that the lamps are caused to flicker on and off intermittently.

It is advisable for the purpose of obtaining accuracy in the use of the instrument to observe and note the precise speed at which the warning lamps are caused to glow when the airplane is in flight. Such speed, of course, may be found by reference to the usual air speed indicator, and any further adjustments which may be found necessary can be made after landing.

The provision of an instrument fitted to each wing is desirable. When an airplane is turning, the outer wing travels faster than the inner wing. The speed of the inner wing, on occasions, may decrease to stalling speed even though the speed of the outer wing is several miles per hour above the stalling speed. In this event the inner wing stalls and then dips, causing the machine to go into a spin.

When the pilot of the airplane is circling preparatory to landing, the warning lamps should not be on, but when the machine is finally turned into the wind and is approaching the ground the pilot should regulate the speed of his machine whereby the lamps are caused to glow intermittently, indicating that the air speed is about ten miles per hour above the stalling speed and, in consequence, danger of ballooning is obviated. As the machine reaches the ground the lamps glow continuously until the machine has nearly stopped, when the contacts 53—47 are broken and the warning lamps are extinguished. Thus, it will be observed, the diaphragm 19 and the contacts 53 and 47 provide an automatic "cut-in" and "cut-out" device, and indicates that the instrument is in efficient working order and is operating correctly.

To prevent the formation of frost or ice on the Venturi tube 76 in high altitudes and under conditions of extreme cold, said Venturi tube may be of that known construction having electrical heating means.

While I have described herein one practical embodiment of the invention, I wish it to be understood that I am aware that modifications in construction, arrangement and design of parts of the instrument may be made within the scope of the appended claiming clauses.

What I do claim is:

1. In a stall warning instrument for attachment to an airplane, an electrical contact system connected by an electrical circuit to a source of electrical energy, said electrical contact system comprising a casing, two diaphragms arranged within said casing electrically insulated therefrom forming in said casing two diaphragm chambers, a Venturi tube secured to said casing and having its suction pipe communicating with said diaphragm chambers, two pairs of electrical contacts consisting each of one contact being secured to one of said diaphragms and one contact being fastened to said casing electrically insulated therefrom, one of said contact pairs being constructed so as to be closed to complete said electrical circuit when the velocity of the airplane is below its stalling speed, and the other of said contact pairs being constructed so as to be broken to interrupt said electrical circuit when the airplane has a velocity above its stalling speed.

2. An electrical contact system according to claim 1, wherein face plates of dielectric material are secured within the casing adjacent to the diaphragms, tubulous bolts with internally threaded shanks are fitted to said face plates, inner bolts have threaded engagement with said tubulous bolts, a contact is fitted on each of said inner bolts, and means are provided for clamping said inner bolts in selected adjusted positions.

3. An electrical contact system according to claim 1, wherein face plates of dielectric material having scales thereon are secured within the casing, tubulous bolts with internally threaded shanks are fitted to said face plates, inner bolts have threaded engagement with said tubulous bolts, a contact is fitted on each of said inner bolts, pointers are on the outer ends of said inner bolts, and locking means are provided for said inner bolts.

4. An electrical contact system according to claim 1, wherein face plates of dielectric material having scales thereon are secured within the casing, tubulous bolts with internally threaded shanks are fitted to said face plates, an inner bolt with a contact at its inner end and a pointer at its outer end has a threaded engagement with one of said tubulous bolts, an inner bolt axially bored has a contact and a pointer at its outer end, a dielectric bush is in the axial bore of said inner bolt, and wherein the contact of a diaphragm is at the end of a rod fitted to said diaphragm and passing through said dielectric bush, and locking means secure said inner bolts in selected adjusted positions.

5. An electrical contact system according to claim 1, wherein face plates having scales marked thereon are fitted in the casing, adjustable bolts each having a fixed contact are passed through said face plates, pointers are fixed on said bolts, means are provided to lock said bolts in selected adjusted positions, and means are provided to lock said pointers in adjusted positions relatively to said bolts.

6. An electrical contact system according to claim 1, wherein the casing has a column with the diaphragms supported on opposite sides thereof, a bore is formed in said column and is in communication with both of said diaphragms, and the suction pipe of the Venturi tube is in communication with the bore of said column.

7. An electrical contact system according to claim 1, wherein the casing is formed with a column having a central hole with a dielectric bush, a metal plug is fitted in said bush, a hole extends through said plug, tubulous bolts are secured to the diaphragms and have their shanks fixed within said plug, a bore is formed in said column and connects the interior of each diaphragm with the suction pipe of the Venturi tube.

8. An electrical contact system according to claim 1, wherein the casing is formed with a column having a central hole with a dielectric bush, a conductor plug is fitted in said bush, a hole extends through said plug, tubulous bolts are secured to the diaphragms and have their shanks fixed within said plug, gaskets encircling said bolts are clamped between the diaphragms and said plug, a bore is formed in said column and registers with an orifice in said plug, and the Venturi tube has its suction pipe connected to said column whereby suction is exerted interiorly of said diaphragms.

CLIVE MURRAY-WALLER.